(12) United States Patent
Chang

(10) Patent No.: US 8,950,582 B2
(45) Date of Patent: Feb. 10, 2015

(54) PROTECTIVE CASE HAVING ELASTICALLY DEFORMABLE AIR CHAMBERS FOR IMPACT REDUCTION

(71) Applicant: Ke-Chang Chang, New Taipei (TW)

(72) Inventor: Ke-Chang Chang, New Taipei (TW)

( * ) Notice: Subject to any disclaimer, the term of this patent is extended or adjusted under 35 U.S.C. 154(b) by 97 days.

(21) Appl. No.: 13/832,724

(22) Filed: Mar. 15, 2013

(65) Prior Publication Data

US 2014/0216973 A1    Aug. 7, 2014

(30) Foreign Application Priority Data

Feb. 7, 2013 (TW) .............................. 102104739 A

(51) Int. Cl.
*B65D 81/02* (2006.01)
*A45C 11/00* (2006.01)
*A45C 13/36* (2006.01)

(52) U.S. Cl.
CPC .............. *B65D 81/022* (2013.01); *A45C 11/00* (2013.01); *A45C 13/36* (2013.01); *H04B 1/3888* (2013.01); *A45C 2011/002* (2013.01); *A45F 2200/0516* (2013.01)
USPC .......................................... 206/521; 206/522

(58) Field of Classification Search
USPC ................................. 206/522, 586, 591, 592
See application file for complete search history.

(56) References Cited

U.S. PATENT DOCUMENTS

| 5,909,806 | A  | * | 6/1999 | Fischel et al. | ................. | 206/320 |
| 6,378,831 | B1 | * | 4/2002 | Copeland, Jr. | .............. | 248/345.1 |
| 7,938,260 | B2 | * | 5/2011 | Lin | ................ | 206/320 |
| 8,204,561 | B2 | * | 6/2012 | Mongan et al. | ............ | 455/575.8 |
| 8,509,865 | B1 | * | 8/2013 | LaColla et al. | ............ | 455/575.8 |
| 8,584,847 | B2 | * | 11/2013 | Tages et al. | .................... | 206/320 |
| 8,718,730 | B1 | * | 5/2014 | LaColla et al. | ............ | 455/575.8 |

* cited by examiner

*Primary Examiner* — Steven A. Reynolds
*Assistant Examiner* — King M Chu
(74) *Attorney, Agent, or Firm* — Bacon & Thomas, PLLC

(57) ABSTRACT

The present invention is to provide a. protective case having elastically deformable air chambers for impact reduction, which is made of an elastically deformable material and includes at least four lateral walls and at least four outer curved walls each connecting adjacent lateral wails, such that the outer curved wails and the lateral walls jointly form and enclose a receiving space. When a portable electronic device is received in the receiving space, the inner sides of the lateral walls lie against the four lateral sides of the periphery of the portable electronic device respectively. Meanwhile, the outer curved walls correspond in position to the four corners of the portable electronic device respectively, but the inner sides of the outer curved walls are not in contact with the portable electronic device, so as to form the air chambers between the outer curved walls and the portable electronic device respectively.

6 Claims, 4 Drawing Sheets

PROTECTIVE CASE HAVING ELASTICALLY DEFORMABLE AIR CHAMBERS FOR IMPACT REDUCTION

FIELD OF THE INVENTION

The present invention relates to a protective case applicable to a portable electronic device, more particularly to a protective case having elastically deformable air chambers for impact reduction, which includes at least four outer curved walls corresponding in position to the four corners of the portable electronic device respectively, but the inner sides of the outer curved walls are not in contact with the portable electronic device, so as to form the air chambers between the outer curved walls and the portable electronic device respectively for substantially protecting the portable electronic device from damage by the impact of an external force.

BACKGROUND OF THE INVENTION

Recently, thanks to the rapid advancement of microcomputer and materials technologies, portable electronic devices have been made progressively smaller and lighter. Therefore, more and more people have changed their reading habits and begun to use e-book readers in place of the traditional paper-based books as the main information reading media. Similarly, digital photo frames are gradually replacing the traditional ones. Also, with the development of mobile broadband networking technology, sonic other portable electronic devices have gained increasing importance in people's daily lives. For example, personal digital assistants (PDAs), smart phones, and tablet PCs have, for some, been indispensable tools for work, socializing, and learning.

Due to their powerful functions and wide application, the aforementioned portable electronic devices are used more and more frequently. To prevent such portable electronic devices from damage, various protective elements were developed, some common commercially available examples of which are laptop/mobile phone skins, protective cases, adhesive protective films, and protective covers. These protective elements serve mainly to protect portable electronic devices from scratches resulting from contact with a pointed object or from friction. When it comes to the impact of an external force, however, the aforesaid protective elements provide little protection, in other words, the conventional protective elements for use with portable electronic devices are configured only for keeping a portable electronic device from superficial damage but not for providing sufficient resistance to collision which may cause substantial damage. Obviously, the protection provided by a conventional protective element to a portable electronic device leaves much to be desired.

Now that existing protective elements designed specifically for portable electronic devices fail to provide complete protection, the issue to be addressed by the present invention is to design a protective case capable of mitigating external impact. This protective case should be able to reduce the impact to which a portable electronic device enclosed in the protective case is subjected, thereby preventing the portable electronic device from damage by collision.

BRIEF SUMMARY OF THE INVENTION

In view of the fact that the conventional protective elements for use with portable electronic devices have such shortcomings in design that they fail to provide comprehensive protection for the portable electronic devices to be protected, the inventor of the present invention conducted extensive research and experiment, made numerous adjustments based on his ample experience in the related industry, and finally succeeded in developing a protective case having elastically deformable air chambers for impact reduction as disclosed herein. The disclosed protective case can provide significantly enhanced protection for a portable electronic device.

It is an object of the present invention to provide a protective case having elastically deformable air chambers for impact reduction. The protective case is applicable to a portable electronic device (e.g., a mobile phone, a tablet PC, or an e-book reader) and is made of an elastically deformable material. The protective case at least includes four lateral walls and four outer curved walls. Each outer curved wall connects two adjacent lateral walls such that the outer curved walls and the lateral walls jointly form and enclose a receiving space. When the portable electronic device is received in the receiving space, the inner sides of the lateral walls lie against the four lateral sides of the periphery of the portable electronic device respectively. Meanwhile, the outer curved walls correspond in position to the four corners of the portable electronic device respectively, but the inner sides of the outer curved walls are not in contact with the portable electronic device. In addition, a first spacing defined between a tangent line tangent to the outer edges of two adjacent outer curved walls and the portable electronic device is greater than a second spacing defined between an extension line extending along the outer side of any of the lateral walls and the portable electronic device. Thus, once the portable electronic device is enclosed in the protective case, and any of the four corners of the protective case is impacted by an external force, the corresponding outer curved wall will be elastically deformed by the external force. The elastic deformation can substantially reduce the impact of the external force, protecting the portable electronic device from damage by the impact of the external force.

Another object of the present invention is to provide a protective case having elastically deformable air chambers for impact reduction, wherein the protective case is applicable to a portable electronic device, is made of an elastically deformable material, and at least includes four outer curved walls, four inner curved walls, and four lateral walls. The periphery of each outer curved wall is sealingly connected to the periphery of a corresponding one of the inner curved walls such that each pair of the sealingly connected outer and inner curved walls jointly form a closed air cell. The closed air cells are connected by the lateral walls such that the closed air cells and the lateral walls jointly form and enclose a receiving space. When the portable electronic device is received in the receiving space, the inner sides of the lateral walls lie against the four lateral sides of the periphery of the portable electronic device respectively, and the closed air cells correspond in position to the four corners of the portable electronic device respectively. Thus, once the portable electronic device is enclosed in the protective case, and any corner of the protective case is impacted by an external force, the outer curved wall corresponding to the corner will be elastically deformed by the external force to reduce the impact of the external force. Not only that, the closed air cell jointly formed by the corresponding outer and inner curved walls can increase impact resistance effectively, thereby providing enhanced anti-collision protection for the portable electronic device.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 1:
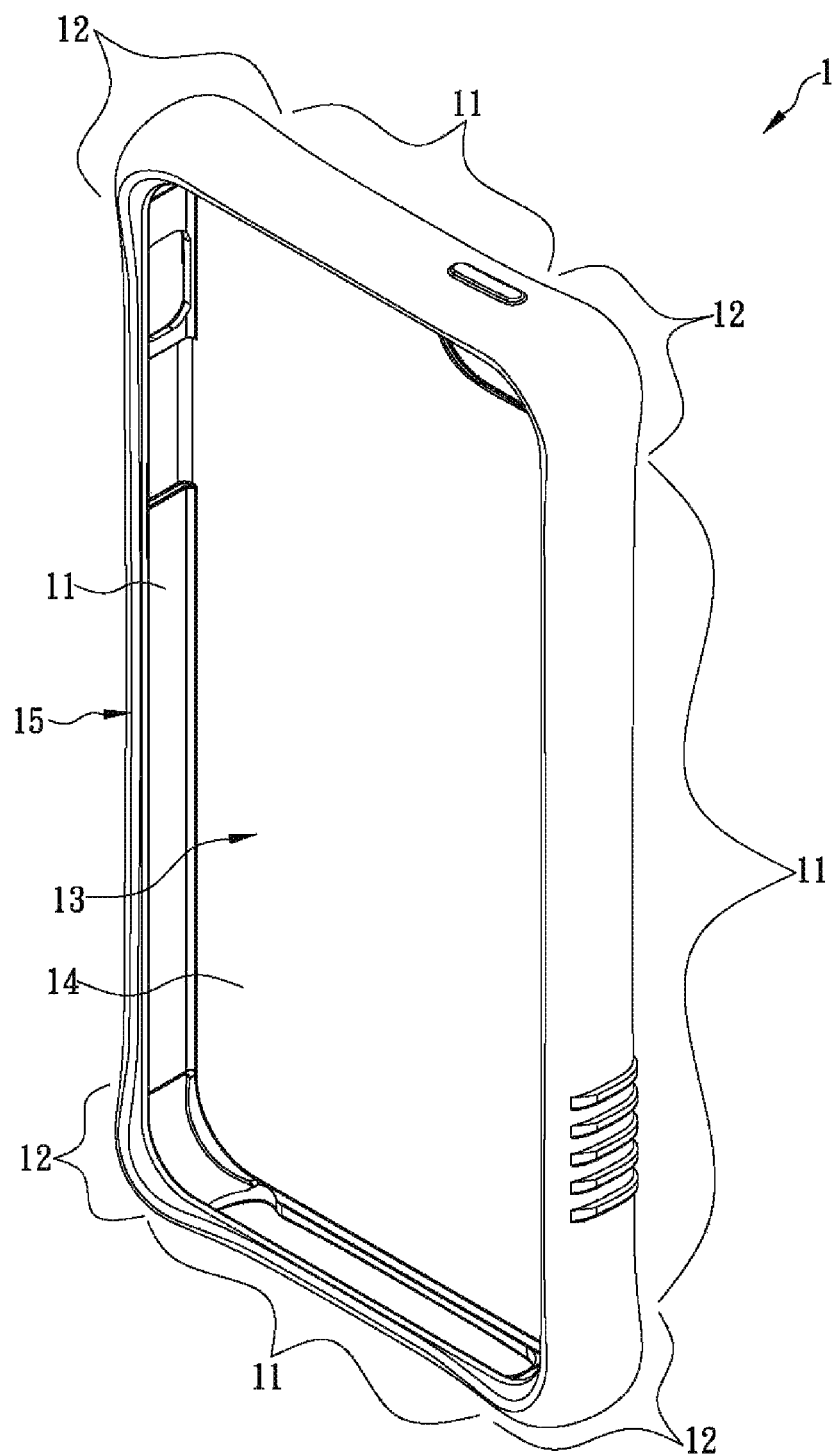
FIG. 1 is a perspective view of the first preferred embodiment of the present invention.

The present invention discloses a protective case having elastically deformable air chambers for impact reduction. Please refer to FIG. 1 for the first preferred embodiment of the present invention. In this embodiment, the protective case 1 is applied to a mobile phone (not shown). By modifying the dimensions of the protective case 1, the dimension-adjusted protective case may alternatively be applied to another portable electronic device such as a tablet PC or an e-book reader. The protective case 1, which is made of an elastically deformable material (e.g., silicone, rubber, or thermoplastic polyurethane), at least includes four lateral walls 11 and four outer curved walls 12. Each outer curved wall 12 connects two adjacent lateral walls 11 such that the lateral walls 11 and the outer curved walls 12 jointly form and enclose a receiving space 13. It should be pointed out that, in the first preferred embodiment, the rear sides of the lateral walls 11 and the rear sides of the outer curved walls 12 are sealingly connected together such that the rear side of the protective case 1 forms a rear wall 14. In addition, the front side of the protective case 1 forms an opening 15 in communication with the receiving space 13, allowing a user to put the mobile phone into the receiving space 13 through the opening 15, with a screen of the mobile phone corresponding in position to the opening 15. Thus, information shown on the screen can be read through the opening 15, and touch control operations, if applicable, can be performed via the screen. The rear wall 14 protects the back panel of the mobile phone from scratches. It should be noted that the embodiment described above is only one preferred embodiment of the present invention. In an alternative embodiment, the rear wall 14 is dispensed with such that the protective case 1 encloses only the periphery of the mobile phone. In practice, a manufacturer may change the design of the protective case according to market response or individual needs.

The protective case 1 of the present invention is generally in the form of a rectangle but has rounded corners. The outer curved walls 12, which are respectively located at the four corners of the protective case 1, are smoothly curved and protrude slightly outward. However, the configuration of the outer curved walls 12 is not limited to the foregoing. In practice, a manufacturer may freely change the shape of the outer curved walls 12 as needed. For example, the outer curved walls 12 may be designed as outwardly projecting, pointed hollow corners, or even in the shape of an animal, a plant, a mushroom, or a cartoon character. All changes or modifications which are based on the features disclosed herein and are readily conceivable by a person skilled in the art should not be seen as departing from the scope of the present invention. The drawings attached to the present specification should not be viewed as restrictive of the scope of the present invention, either.

Figure 2:
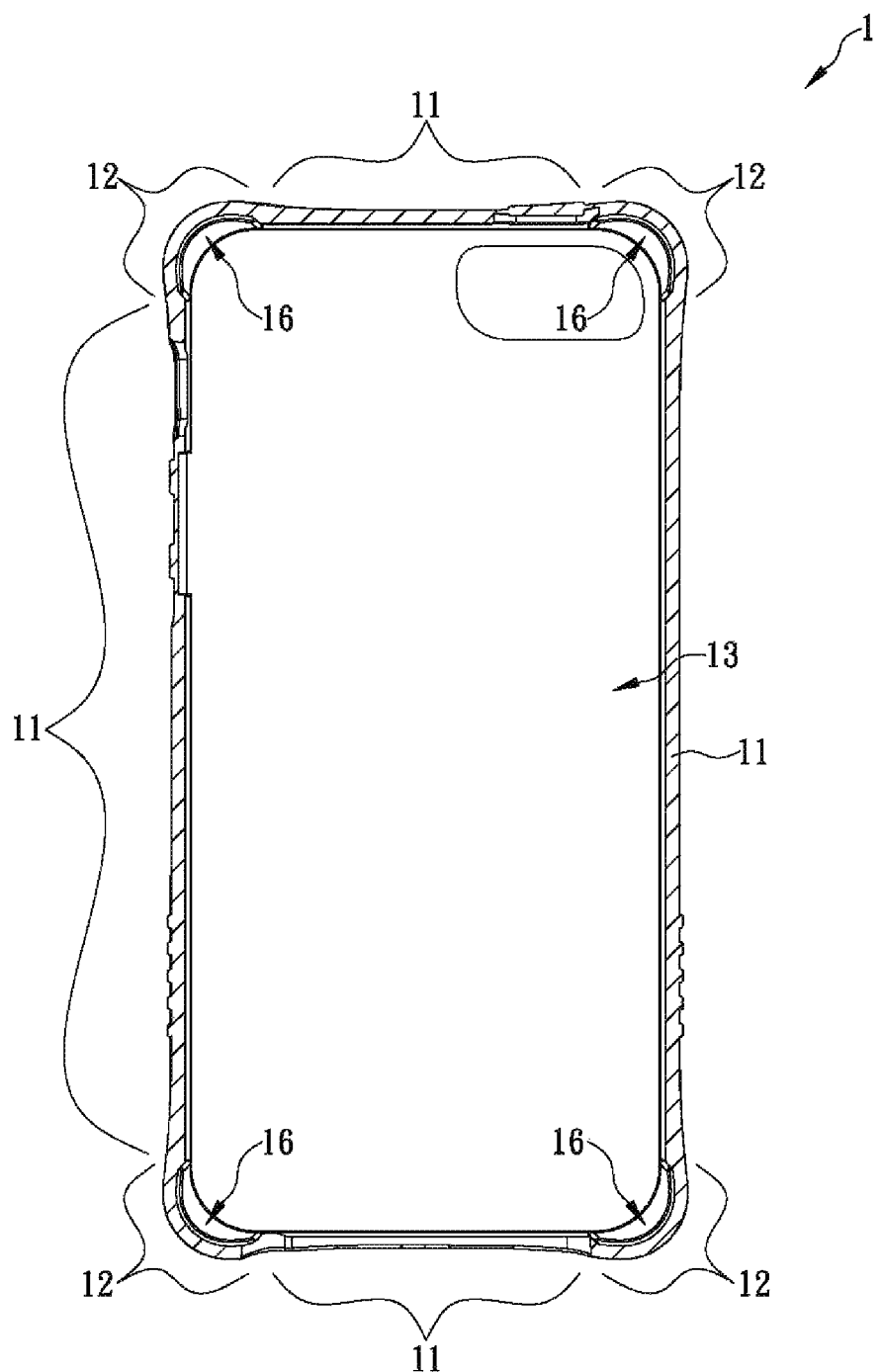
FIG. 2 is a sectional view of the first preferred embodiment of the present invention.
Figure 3:
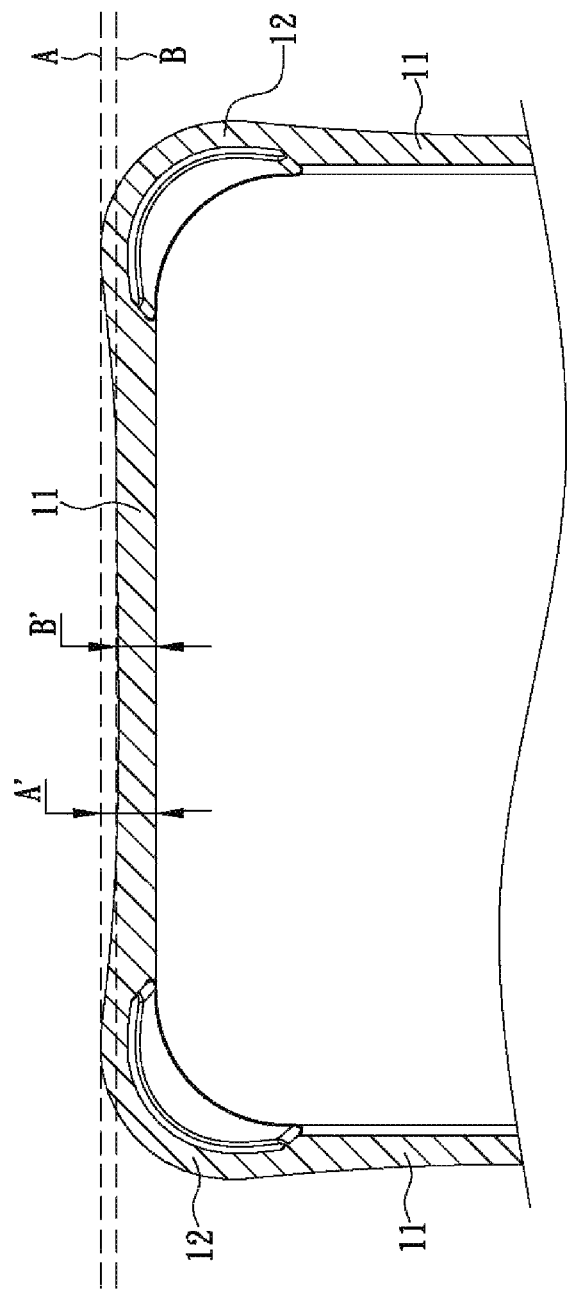
FIG. 3 is a partial sectional view of the first preferred embodiment of the present invention.

Reference is now made to FIG. 2 for a sectional view of the first preferred embodiment of the present invention. In this preferred embodiment, once the mobile phone is received in the receiving space 13, the inner sides of the lateral walls 11 lie against the four lateral sides of the periphery of the mobile phone respectively. Meanwhile, the outer curved walls 12 correspond in position to the four corners of the mobile phone respectively, and yet the inner sides of the outer curved walls 12 are not in contact with the mobile phone. As a result, a buffer gap 16 is formed between each outer curved wall 12 and the mobile phone. When any of the outer curved walls 12 is squeezed by an external force, that outer curved wall 12 and consequently the air chamber formed by the corresponding buffer gap 16 are deformed. In the first preferred embodiment, referring to FIG. 3, a line tangent to the outer edges of two adjacent outer curved walls 12 is defined as a tangent line A, and a line extending along the outer side of any lateral wall 11 is defined as an extension line B. FIG. 3 clearly shows that a first spacing A' defined between the tangent line A and the mobile phone is greater than a second spacing B' defined, between the extension line B and the mobile phone. Therefore, if the mobile phone, enclosed in the protective case 1, is accidentally dropped to the ground, the outer curved walls 12 will be the first to hit the ground, thus preventing the lateral wails 11 from direct contact with the ground. In other words, the impact will be applied directly to the outer curved wails 12 rather than the lateral walls 11 or the mobile phone. Hence, once the mobile phone is enclosed in the protective case 1, and any of the four corners of the protective case 1 is impacted by an external force, the external force will deform the corresponding outer curved wall 12 elastically such that the impact of the external force is substantially reduced and kept from damaging the mobile phone. The inventor conducted numerous dropping tests with a mobile phone enclosed in the protective case 1 in the first preferred embodiment of the present invention, and the test results show that the mobile phone was not damaged even after it had been dropped from the height of the test performer's waist many times. This demonstrates that the protective case 1 of the present invention is indeed capable of protecting the portable electronic device enclosed therein.

Figure 4:
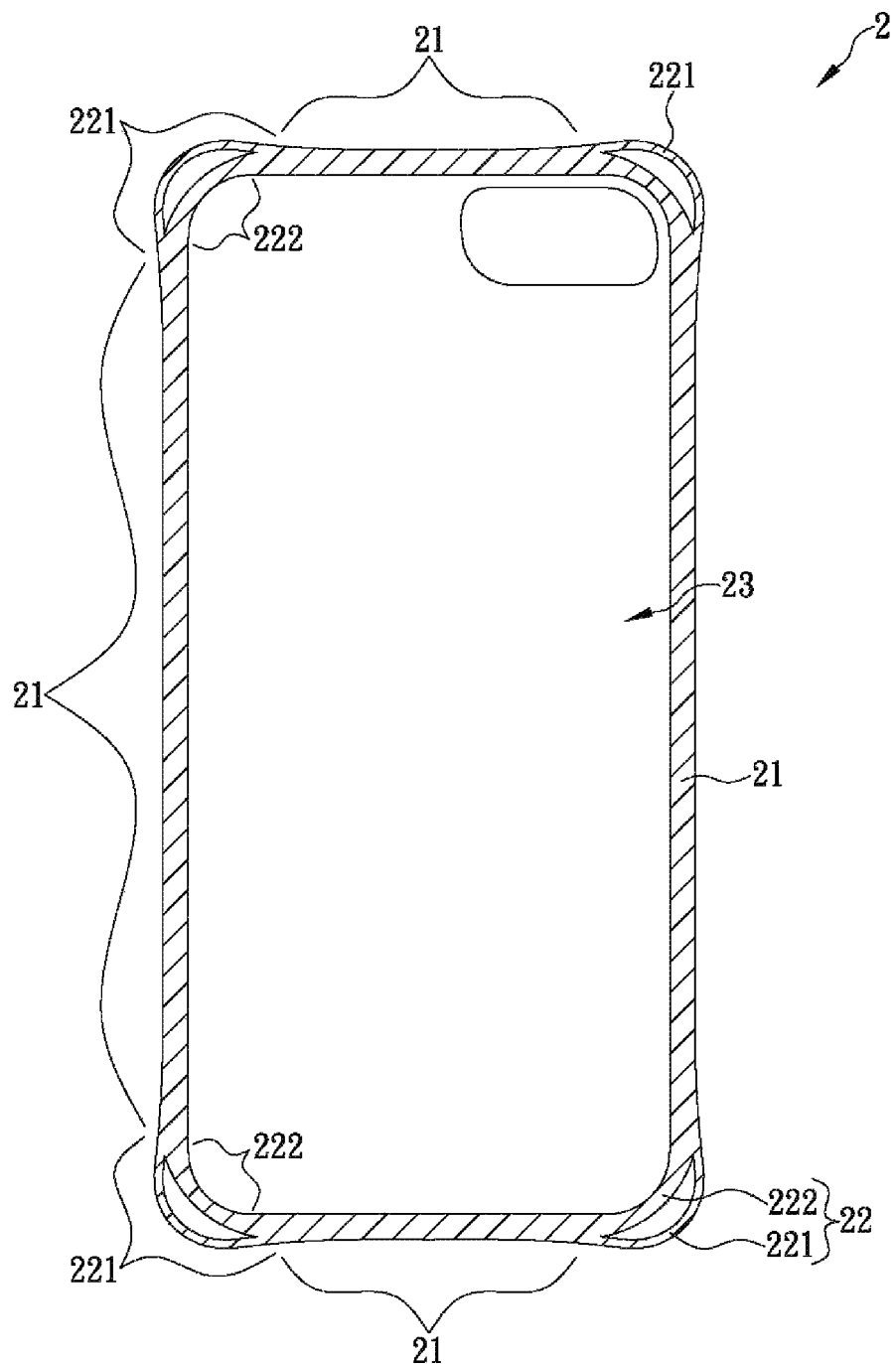
FIG. 4 is a sectional of the second preferred embodiment the present invention.

FIG. 4 shows a sectional view of the second preferred embodiment of the present invention. In the second preferred embodiment, the protective case 2 is applied to another portable electronic device (not shown). The protective case 2 is made of an elastically deformable material and at least includes four lateral walls 21, four outer curved walls 221, and four inner curved walls 222. In the second preferred embodiment, the periphery of each outer curved wall 221 is sealingly connected to the periphery of a corresponding inner curved wall 222 such that each pair of the sealingly connected outer and inner curved walls 221 and 222 jointly form a closed air cell 22. In practice, however, the connection between each outer curved wall 221 and the corresponding inner curved wall 222 may vary. For example, each inner curved wall 222 may have two ends respectively and sealingly connected to the inner sides of the two ends of the corresponding outer curved wall 221 that are respectively connected to the adjacent lateral walls 21. That is to say, the two ends of each inner curved wail 222 are respectively connected not only to the two ends of the corresponding outer curved wall 221, but also to the corresponding two lateral walls 21. In that case, the buffer gaps 16 in FIG. 2 will each be formed between a connected pair of inner and outer curved walls 222 and 221, and this configuration still falls within the scope of the present invention. In the second preferred embodiment, referring back to FIG. 4, when an external force is applied to and elastically deforms any of the outer curved walls 221, the air sealed in the corresponding closed air cell 22 is compressed. Consequently, the pressure in that closed air cell 22 is greater than the pressure outside and generates an outward pushing force. Therefore, should an outer curved wall 221 be elastically deformed by an external force, the impact of the external force will be resisted by the pressure of the air sealed in the corresponding closed air cell 22 as well as by the elastic restoring force of the outer curved wall 221.

Each closed air cell 22 connects two adjacent lateral walls 21 such that the lateral walls 21 and the closed air cells 22 jointly form and enclose a receiving space 23. When the portable electronic device is received in the receiving space 23, the inner sides of the lateral walls 21 lie against the four lateral sides of the periphery of the portable electronic device respectively, and the closed air cells 22 correspond in position to the four corners of the portable electronic device respectively. Thus, once the portable electronic device is enclosed in the protective case 2, and any of the corners of the protective case 2 is impacted by an external force, the outer curved wall 221 corresponding to the corner will be elastically deformed by the external force to reduce the impact of the external force. Furthermore, the closed air cell 22 jointly formed by the corresponding outer curved wall 221 and inner curved wall 222 increases impact resistance effectively and provides the portable electronic device with enhanced protection against collision.

In summary, referring again to FIG. 2, the main features of the present invention are such that, whenever an outer curved wall 12 is subjected to an external force, deformation of the outer curved wall 12 leads to deformation of the air chamber formed by the corresponding buffer gap 16, and, in doing so, the protective case 1 gives protection to the portable electronic device enclosed therein. The protective case 1 of this hollowed-out design is advantageously lightweight and easily portable. Besides, the present invention allows greater freedom in the choice of material. More specifically, the protective case 1 is not necessarily made of a highly elastic material such as silicone. The same protective effect can be achieved if thermoplastic polyurethane (TPU), which has lower elasticity than silicone, is used instead. Now that eligible materials abound, the exterior design of the protective case 1 may have greater variability than is traditionally allowed a transparent protective case can be made out of TPU, which adds significantly to the market competitiveness of the final product.

While the invention herein disclosed has been described by means of specific embodiments, numerous modifications and variations could be made thereto by those skilled in the art without departing from the scope of the invention set forth in the claims.

What is claimed is:

1. A protective case having elastically deformable air chambers for impact reduction, the protective case being applicable to a portable electronic device and made of an elastically deformable material, the protective case comprising:

four lateral walls;

four outer curved walls each connecting two adjacent said lateral walls such that the lateral walls and the outer curved walls jointly form and enclose a receiving space, wherein when the portable electronic device is received in the receiving space, inner sides of the lateral walls lie against four lateral sides of a periphery of the portable electronic device respectively, the outer curved walls correspond in position to four corners of the portable electronic device respectively, with inner sides of the outer curved walls not being in contact with the portable electronic device such that a buffer gap is formed between each said outer curved wall and the portable electronic device, and a first spacing defined between a tangent line tangent to two adjacent said outer curved walls and the portable electronic device is greater than a second spacing defined between an extension line extending along an outer side of any said lateral wall and the portable electronic device; and four inner curved walls each having two ends respectively and sealingly connected to inner sides of two ends of a corresponding said outer curved wall that are respectively connected to two adjacent said lateral walls, such that said buffer gap is formed between each said inner curved wall and the corresponding outer curved wall.

2. The protective case of claim 1, wherein a periphery of each said inner curved wall is sealingly connected to a periphery of the corresponding outer curved wall such that each said inner curved wall and the outer curved wall sealingly connected thereto jointly form a closed air cell.

3. The protective case of claim 1, wherein when the portable electronic device is received in the receiving space, inner sides of the inner curved walls lie against the four corners of the portable electronic device respectively.

4. The protective case of claim 2, wherein when the portable electronic device is received in the receiving space, inner sides of the inner curved walls lie against the four corners of the portable electronic device respectively.

5. The protective case of claim 3, wherein rear sides of the lateral walls and rear sides of the outer curved walls are sealingly connected together such that a rear side of the protective case forms a rear wall, and wherein the protective case has a front side formed as an opening in communication with the receiving space.

6. The protective case of claim 4, wherein rear sides of the lateral walls and rear sides of the outer curved walls are sealingly connected together such that a rear side of the protective case forms a rear wall, and wherein the protective case has a front side formed as an opening in communication with the receiving space.

* * * * *